United States Patent [19]

Bond et al.

[11] 4,172,604
[45] Oct. 30, 1979

[54] TRAILER VEHICLE APPARATUS WITH IMPROVED PARKING SUPPORT

[75] Inventors: Ronald L. Bond, Valdosta; E. C. Daughdrill, Lake Park; Henry T. Brice, Valdosta, all of Ga.; Phineas E. Horton, III, Portsmouth, Va.

[73] Assignee: Swacais, Inc., Valdosta, Ga.

[21] Appl. No.: 841,721

[22] Filed: Oct. 13, 1977

Related U.S. Application Data

[60] Division of Ser. No. 611,133, Sep. 8, 1975, Pat. No. 4,054,301, which is a continuation-in-part of Ser. No. 480,606, Jun. 19, 1974, abandoned, which is a continuation of Ser. No. 377,752, Jul. 9, 1973, Pat. No. 3,858,939.

[51] Int. Cl.² .............................................. B60S 9/04
[52] U.S. Cl. .................................................... 280/764
[58] Field of Search ............... 280/763, 764, 765, 766, 280/475, 429

[56] References Cited
U.S. PATENT DOCUMENTS 3,146,002 8/1964 Faber .................................... 280/763
3,281,160 10/1966 Vinther ................................ 280/763
3,315,973 4/1967 Marple .............................. 280/763 X

FOREIGN PATENT DOCUMENTS 613703 11/1926 France ..................................... 280/763

Primary Examiner—John A. Pekar
Attorney, Agent, or Firm—Jones, Thomas & Askew

[57] ABSTRACT

A waste collection system including a trailer and a towing vehicle which is selectively interconnectable with the trailer. The trailer, which may be divided into a number of separate interior compartments, has a prow-shaped forward end wall which extends beyond and above the trailer hitch to enlarge the material-receiving capacity of the trailer. A towing vehicle is disclosed which can selectively elevate and tilt the trailer sufficiently to dump the contents of the trailer. An alternative towing vehicle is disclosed which provides a trailer hitch having a limited extent of vertical adjustment necessary to raise and lower a parking support associated with the trailer. The trailer is provided with a ground support stand which is automatically locked in downward support position.

5 Claims, 9 Drawing Figures

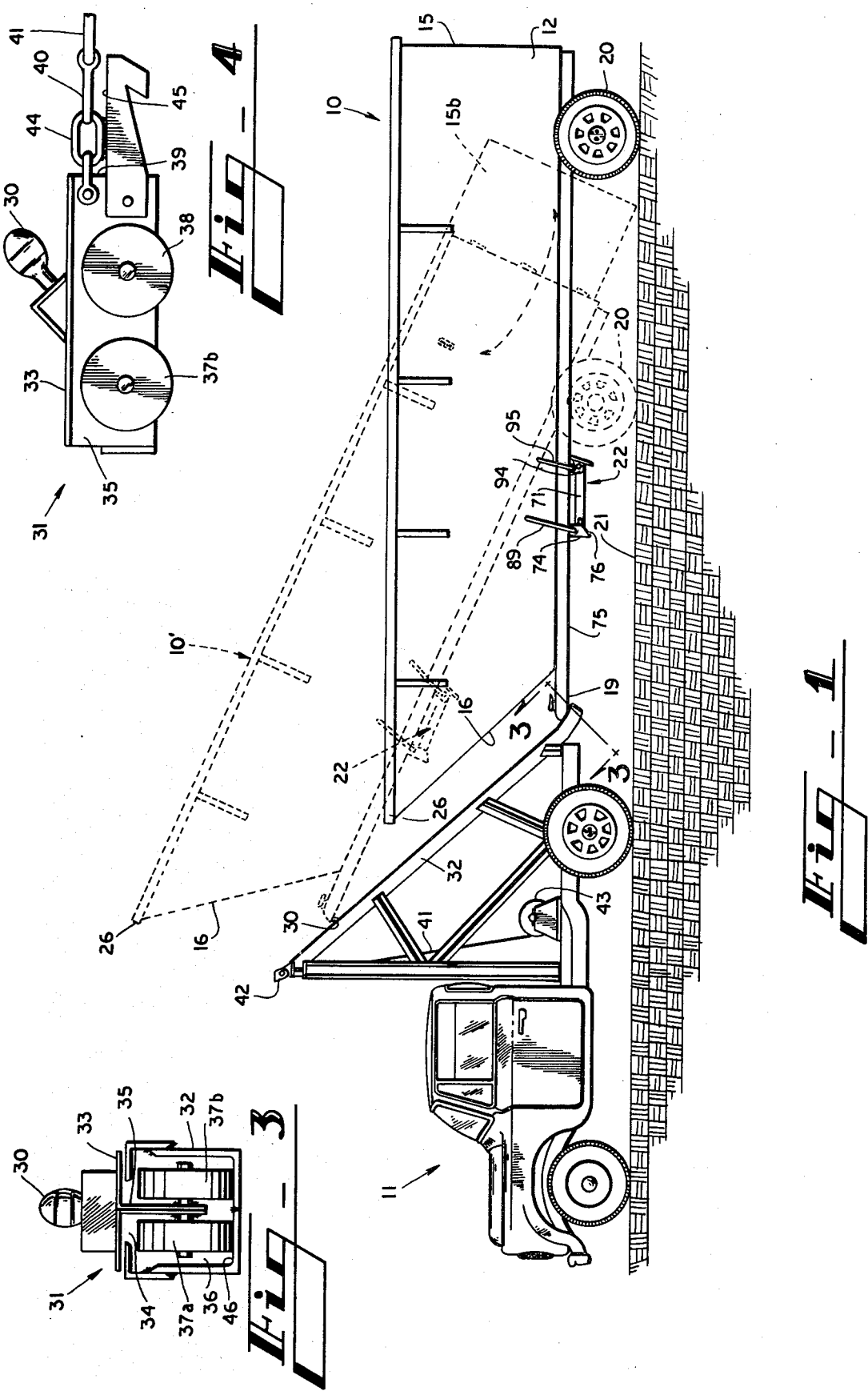

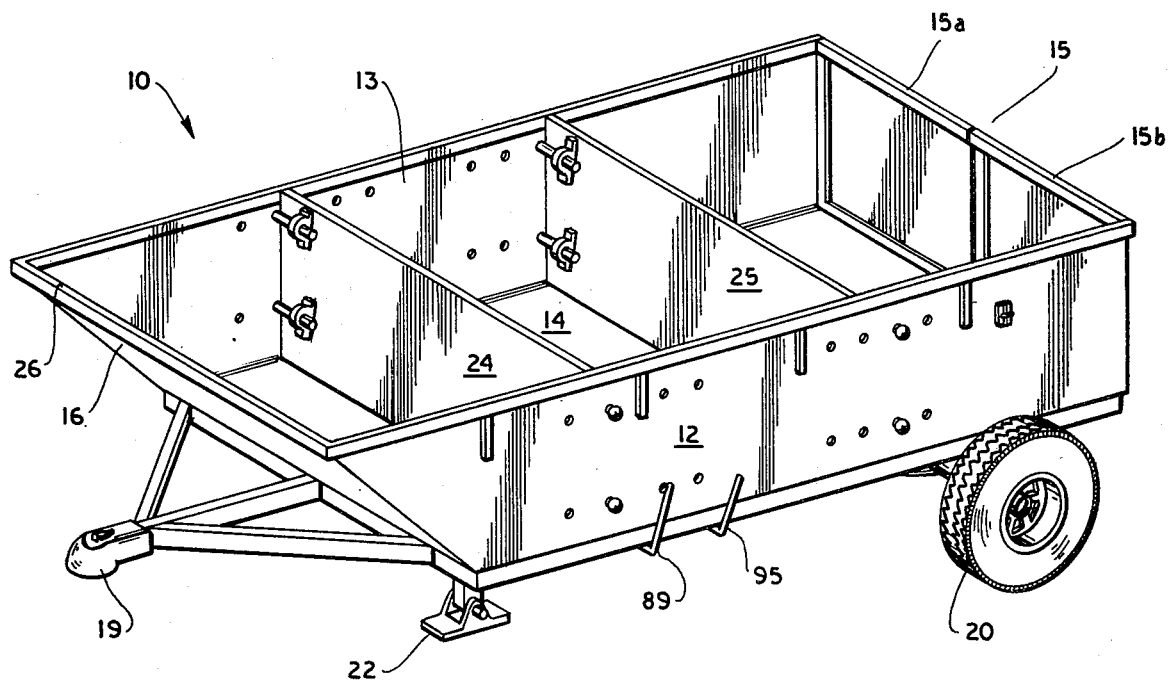
_Fig_2
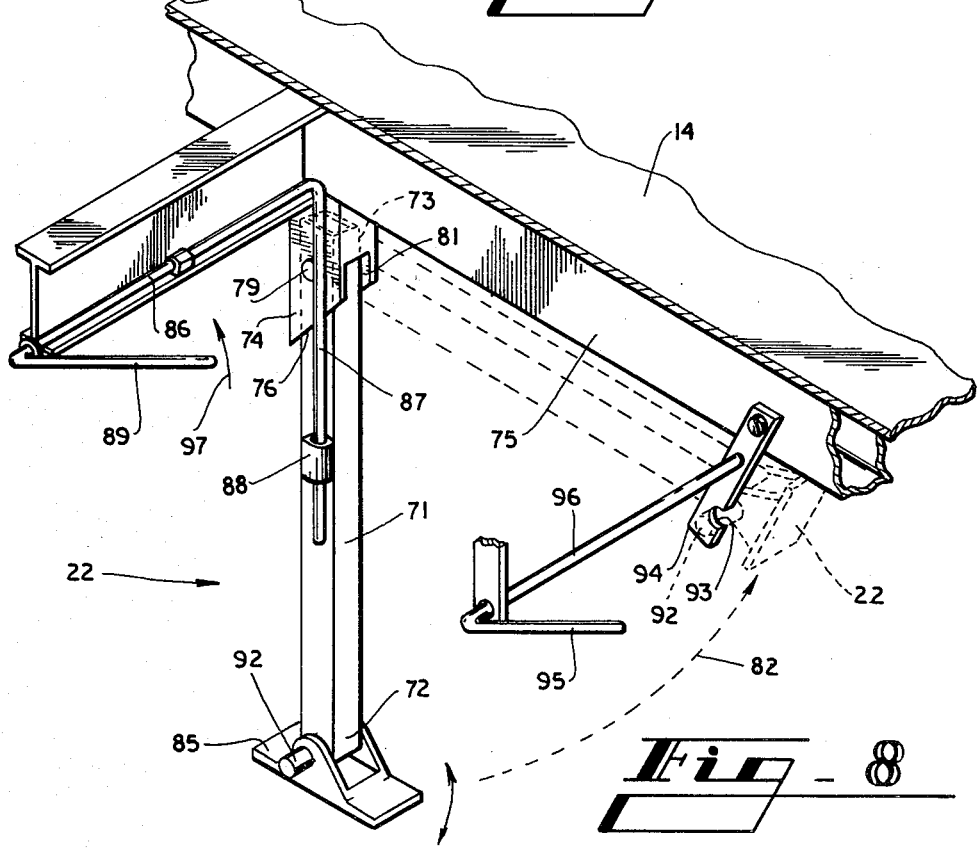
_Fig_8

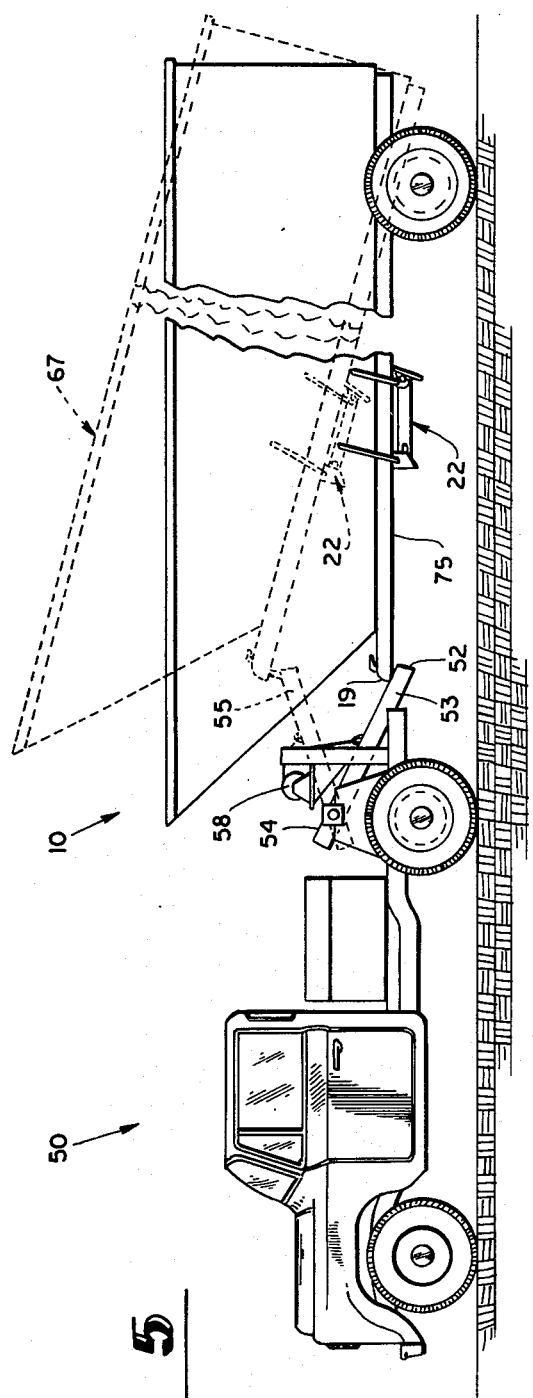
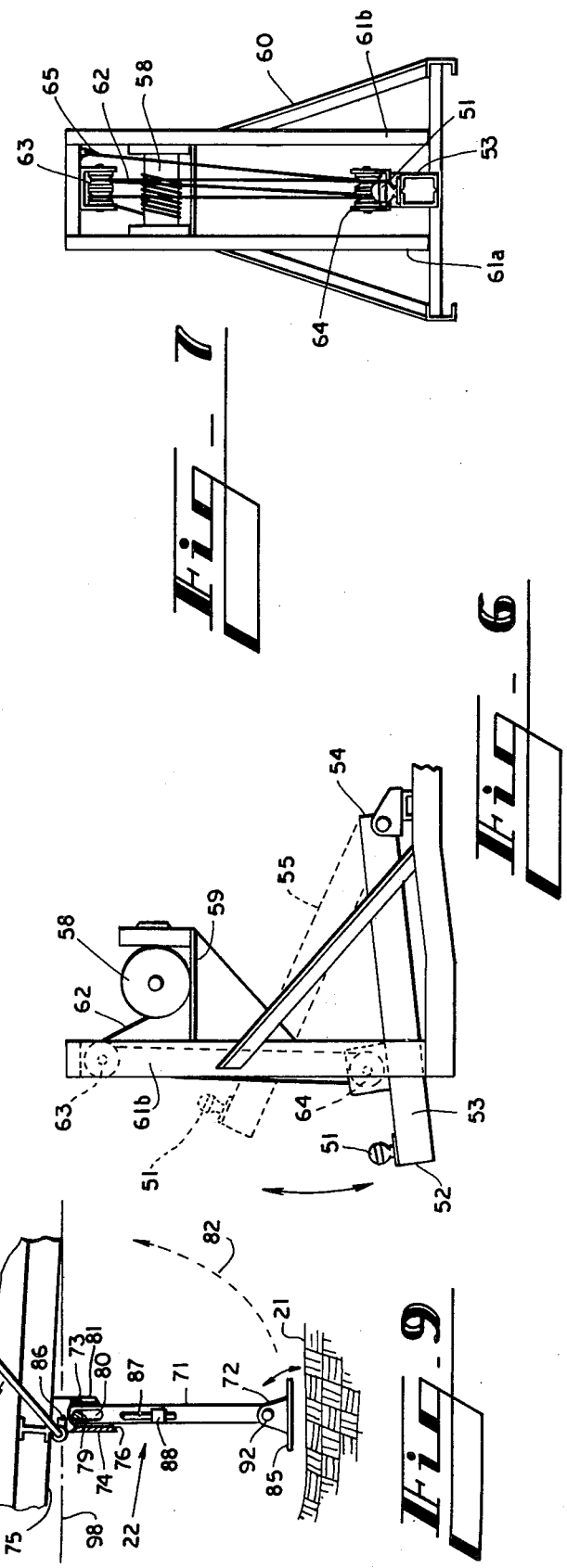

TRAILER VEHICLE APPARATUS WITH IMPROVED PARKING SUPPORT

This application is a division of Ser. No. 611,133 filed Sept. 8, 1975, now U.S. Pat. No. 4,054,301, which is a continuation-in-part of Ser. No. 480,606 filed June 19, 1974, now abandoned which is in turn a continuation of Ser. No. 377,752 filed July 9, 1973 and now issued as U.S. Pat. No. 3,858,939.

This invention relates in general to a vehicular system including a trailer and a towing vehicle, and in particular to a vehicular system including towing vehicles and trailers particularly useful for collection and recovery of solid waste material or the like.

The collection, transportation, and appropriate disposition of waste materials have long been a problem to private parties and municipalities concerned with handling substantial volumes of trash and other solid waste material. Although equipment of various types is available for collecting, compacting, transportating, and/or disposing of solid waste material, the trend in such equipment is toward greater complexity and concomitantly increased expense, both for acquisition and for upkeep. This trend toward more expensive waste-handling equipment is particularly burdensome to smaller municipalities and communities, many of which may be having difficulty in maintaining present levels of waste collection service within existing tax revenues.

One particularly useful solution to the foregoing problem is set forth in the aforementioned copending patent application Ser. No. 480,606, which discloses a vehicular system including a waste collection trailer and a towing vehicle. The waste collection trailers of that system can be provided at a cost which is low enough to allow a number of such trailers to be obtained and located at separate waste collection locations, with a smaller number of towing vehicles being sufficient to periodically tow the waste collection trailers to a suitable waste dumping location.

While the waste collection system described in the aforementioned pending application has met with substantial acceptance, it has been found that the foregoing system and its components can be further improved to increase the material handling capacity of the trailers, as well as to provide a towing vehicle which is especially useful for transporting trailers to and from locations of use.

According to the present invention, accordingly, the waste handling capacity of the trailer is improved by providing the forward end of the trailer with a prow shape which extends forwardly of and above the hitch or other towing connection provided on the trailer. The improved trailer towing vehicle is provided with a vertically-positionable towing hitch which can be raised to an upper position, so that a ground support member on the trailer can be extended or retracted to support the front end of a parked trailer or which can be moved to a lower position in which the towing hitch is completely uncoupled from the trailer. The provision of a vertically-adjustable hitch on the towing vehicle allows trailers to be readily coupled and uncoupled for parking at waste collection locations, without requiring each individual trailer to be equipped with relatively expensive adjustable supporting jacks.

Accordingly, it is an object of the present invention to provide improved vehicular system and apparatus for collection and handling of waste material.

It is another object of the present invention to provide an improved waste collection trailer.

It is still another object of the present invention to provide an improved towing vehicle for use with waste collection trailers.

Other objects and advantages of the present invention will become more readily apparent from the disclosed embodiments thereof, including the drawing in which:

FIG. 1 shows an elevation view of a vehicular system including a trailer and towing vehicle according to a disclosed embodiment of the present invention;

FIG. 2 is a pictorial view of the trailer shown in FIG. 1;

FIG. 3 is a section view of the elevated track assembly for the towing hitch, in the towing vehicle, taken along line 3—3 of FIG. 1;

FIG. 4 is a detail side elevation view showing an embodiment of towing hitch carrier depicted in FIG. 3;

FIG. 5 is a side elevation view of a vehicular system using a disclosed alternative embodiment of towing vehicle;

FIG. 6 is a detail side elevation view of the towing hitch and hitch elevating mechanism used in the towing vehicle of FIG. 5;

FIG. 7 is a rear end elevation view of the towing hitch and elevating mechanism shown in FIG. 6;

FIG. 8 is a fragmentary elevation view of a ground support stand according to the disclosed embodiment; and FIG. 9 shows the ground support stand in trailer supporting position.

Turning to the embodiment depicted in FIGS. 1 and 2, there is shown a vehicular system including a trailer indicated generally at 10 and a towing vehicle indicated generally at 11. The trailer is depicted in its towing position by the solid-line view in FIG. 1, and in elevated dumping position by the brokenline view 10' in that Figure. The trailer 10 has an overall material receiving volume defined by a pair of side members 12 and 13, a floor 14, a rear wall 15, and a front wall 16. The rear wall 15 is preferably of the type which provides an openable tailgate to facilitate dumping or other removal of the trailer contents. One type of openable tailgate is provided through the use of rear doors 15a and 15b which are connected at the rear ends of the respective side walls 13 and 12 with hinges that allow the doors to swing outwardly. One of the open doors 15b is shown in phantom at FIG. 1. Those skilled in the art will recognize that an openable dumping tailgate may alternatively be provided by a unitary rear wall 15 which is pivotally mounted between the side walls 12 and 13 for horizontal swinging movement.

The trailer 10 includes a hitch 19 at the forward end, and wheels 20 spaced rearwardly from the towing hitch 19. It will be understood that the gross weight of the trailer 10 is supported on the ground 21 by the wheels 20 and by the interconnection of the hitch 19 with the towing hitch 30 on the towing vehicle 11.

The trailer 10 is provided at its forward end with a ground support stand 22 which is selectively lowerable into the position shown in FIG. 2, whereat the forward end of an unhitched trailer is supported on the ground by the ground support stand to maintain the trailer floor 14 in proximately a horizontal condition. The ground support stand 22 enables the trailers 10 to be parked at various desired points of utilization and then uncoupled from the towing vehicle 11, so that a particular towing vehicle can service a number of individual trailers.

Although the present trailer can be equipped with a known type of ground support stand having a jack which is moved between raised and lowered positions by a mechanism such as a screw member, or which requires the operator to crawl beneath the trailer for manipulating the jack, an embodiment of a particularly effective and useful ground support stand 22 is depicted in FIGS. 1, 5, 8, and 9. The ground support stand 22 shown therein includes a support member 71 having a lower end 72 and an upper end 73 pivotally connected to an attachment member 74 affixed, as by welding or by any other suitable technique, to the underside 75 of the trailer 10. The attachment member 74 has a hollow interior which defines a socket 76 complementary in configuration to the upper end 73 of the support member 71; the inside dimensions of the socket 76 are slightly greater than the corresponding outside dimensions of the upper end 73, so that the upper end of the support member 71 is freely slideable into and out of the socket 76. Both the support member 71 and the socket 76 have a generally-rectangular cross-section configuration, in the disclosed embodiment, although the particular configuration of these elements is not considered to be critical.

The upper end 73 of the support member 71 is fastened to the attachment member 74 with a lost-motion connection, such as the connection provided by the pin 79 which extends through the longitudinal elongate slot 80 secured within the socket 76 of the support member. The lost-motion connection provided by the pin 79 and the slot 80 allows the support member 71 to move either to the upper position shown in FIG. 8, in which the upper end 73 is received within the socket, or to the lower position shown in FIG. 9 in which the upper end of the support member substantially extends below the socket. The rearward portion of the attachment member 74 is cut away at 81 so that the support member 71, when fully lowered with respect to the socket 60, can pivot rearwardly and upwardly along the path indicated by the broken line 82.

Since the trailer 10 may be parked in locations where the ground surface 21 is broken or uneven, the lower end 72 of the support member 71 is provided with a foot plate 85 which is pivotally connected to the support member. The pivotal connected of the foot plate 85 to the support member 71 allows the foot plate to assume an attitude which most favorably corresponds with the surface of ground beneath the foot plate.

So that the support member 71 can be raised along the path 82 without requiring an operator to crawl beneath the trailer 10, a crank shaft 86 is pivotally connected to the underside 75 of the trailer so that a first crank arm 87 extends from the shaft 86 to lie proximately alongside the support member 71. A crank arm guide 88, affixed to the aforementioned proximate side of the support member 71, loosely surrounds the first crank arm 87 so that the support member 71 can slide upwardly or downwardly within the socket 76 without interference from the first crank arm. A second crank arm 89 is provided on the crank shaft 86 alongside the trailer 10, or at another appropriate location which is readily accessible without crawling beneath the trailer 10.

The support member 71 is maintained in the retracted position shown in FIG. 1, by retaining apparatus including the pin 92 projecting outwardly from the lower end 72 a short distance above the foot plate 85. When the support member 71 is moved to the retracted position by manipulating the second crank arm 89, the pin 92 engages the catch 93 formed in the arm 94 so that the support member 71 is retained in retraction. The arm 94 may be appropriately biassed to pin-retaining position either by a suitable spring member (not shown) or simply by appropriate movement of the handle 95 on the shaft 96 which is attached to the arm 94 and is mounted for rotation on the under side of the trailer 10.

The disclosed ground support stand 22 operates in the following manner. When it is desired to park a trailer 10 at a particular location, the forward end of the trailer is initially elevated a sufficient distance above the normal trailer-towing elevation 98 (FIG. 8) to allow the support member 71 to swing freely into the downwardly-depending position. The operator then manipulates the handle 95 to release the catch 94, so that the support member 71 pivots downwardly from the retracted position of FIG. 1 to the extended position shown in FIG. 8. The upper end 73 of the support member 71 is not presently received within the socket 76. The operator next lowers the hitch on the towing vehicle 11 to lower the forward end of the trailer, whereupon the foot plate 85 contacts the ground 21 and the upper end 73 of the support member 71 slides into the socket 71 to the full extent provided by the lost-motion connection or by the depth of the socket. Further downward movement of the towing vehicle hitch causes the hitch to be completely uncoupled from the trailer hitch 19, since the forward end of the trailer is maintained in predetermined relation above the ground 21 by the support member 71. Since the upper end of the support member 71 is received within the socket 76 at this time, the support member is rigidly restrained from any movement and the trailer is positively maintained in predetermined position.

When it is desired to reconnect a towing vehicle 11 to a parked trailer, the connecting hitch of the towing vehicle is positioned beneath the trailer hitch 19 and then elevated sufficiently to raise the foot plate 85 above the ground. The support member 71 will have gravitated downwardly through the pin-slot lost motion connection to arrive at the position shown in FIG. 8, and the operator may now simply manipulate the second crank arm 89 in the direction shown by the arrow 97 to pivot the support member 71 upwardly along the path 82 for retaining engagement of the pin 92 by the catch 93.

The trailer 10 may be divided into a number of separate trash receiving compartments by the partitions 24 and 25, shown in FIG. 2, and the partitions may be pivotally attached between the side members 12 and 13 for swinging movement which allows the contents of the several compartments to be individually and serially dumped in the manner described in the aforementioned copending application. Alternatively, some or all of the partitions 24 and 25 may be omitted from the trailer 10 for applications which do not require different types of waste material to be separately maintained.

The front wall 16 of the trailer 10 extends forwardly and upwardly from the floor 14 to the upper edge 26 of the front wall, at a forward-sloping diagonal wall as seen in FIG. 1, so that the usable interior volume of the trailer is increased over the volume obtainable with a conventional trailer having a vertical front wall. With the forward-sloping diagonal wall 16, it can be seen that the forwardmost extent of the trailer is provided by the upper edge 26 of the front wall, which can actually extend to a location in front of the towing hitch 19.

The towing vehicle 11 includes a towing hitch 30 which is selectively connectable to the trailer hitch 19, and which is mounted on a hitch carrier 31 received within an elongate hitch track 32 diagonally mounted on the towing vehicle. A section view of the hitch track 32 including the hitch carrier 31 is shown in FIG. 3, with a detail side view of the hitch carrier being shown in FIG. 4. The hitch 30 is secured to a plate 33 which extends above and over the elongated slot 34 which extends along the length of the upper side of the hitch track 32, and a carrier plate 35 is secured to the plate 33 and extends downwardly through the slot 34 into the channel 36 which extends within the length of the hitch track. Two pairs of carrier wheels are rotatably connected to the carrier plate 35, with a first pair of wheels 37a and 37b being visible in FIG. 3 and which one wheel 38 of the second pair being shown in FIG. 4. The lateral spacing of each pair of carrier wheels is selected, relative to the width of the slot 34, to prevent the wheels and carrier plate 35 from being withdrawn upwardly through the slot. The wheels normally rest on the floor 46 of the channel 36, as shown in FIG. 3.

Attached to the forward end 39 of the carrier plate 35, as by the flexible interconnection provided by the chain 40, is a cable 41 which extends upwardly within the channel 36 to turn over a pulley 42 mounted at the upper end of the hitch track 32, and which then extends downwardly to a winch 43 secured to the towing vehicle 11. A link 44 of the chain 40 may be secured to the support member 45 to prevent the chain and attached cable from the becoming misaligned within the channel 36.

It will be understood from the foregoing that the utility of the forwardly-sloping diagonal front wall 16 of the trailer 10 is permitted by a towing vehicle such as the vehicle 11, which lacks any structure in interference with the forward wall. The diagonal hitch track 32 of the towing vehicle 11 is complementary to the diagonal position of the forward wall 16. An alternative embodiment of towing vehicle 50 is shown in FIG. 5, wherein the towing vehicle is interconnected with the trailer 10 by means of a towing hitch 51 which is mounted at the rear end 52 of a hitch supporting arm 53, having a forward end pivotally connected at 54 to a location on the body of the towing vehicle. The hitch support arm 53 is thus supported for pivotal movement between the lower position shown in solid line in FIG. 5, and an upper position 55 shown in broken line in that Figure.

The hitch support arm 53 is moved between the upper and lower positions by any appropriate motive means. A particular motive means is provided in the disclosed embodiment by a winch 58 mounted on a platform 59 which is supported above the arm 53 by the framework 60, including a pair of upright support members 61a and 61b which flank the arm 53. A cable 62 exends upwardly from the winch 58 to a first set of sheaves 63, and then extends downwardly from the sheaves 63 to a second set of sheaves 64 attached to the upper side of the arm 53 at an intermediate point between the hitch 51 and the pivotal connection 54. The free end of the cable 62 may be attached to the upper end of the framework 60, as shown at 65. It will be understood that the winch 58 is preferably, although not necessarily, operated by a source of motive power such as an electric motor or the like, and is equipped with a brake or another appropriate movement-blocking device so that the arm 53 may be maintained at any position between the uppermost and lowermost positions, while the trailer 10 is attached to the hitch 51 on the arm. It will also be apparent that other types of lifting devices can be substituted for the winch and cable arrangement shown in FIGS. 5-7.

Considering the operation of the embodiment depicted in FIGS. 5-7, it is first assumed that a trailer 10 is parked with the forward end of the trailer being supported by the downwardly-extended ground support stand 22. The lowermost position of the hitch support arm 53 should enable the towing hitch 51 to be positioned for interconnection with the trailer hitch 19, without requiring auxiliary jacks or other devices to manipulate to elevate the trailer sufficiently for hitch interconnection. Assuming that a conventional ball and socket hitch is used, the lowermost position of the arm 53 should allow the towing hitch ball 51 to be positioned beneath the hitch socket 19 on the trailer. The hitch support arm 53 is now elevated by the winch 58 at least to an extent which removes the weight of the trailer 10 from the ground support stand 22, so that the ground support stand can easily be moved to the broken-line position shown in FIG. 5. The hitch support arm 53 can now be lowered, if necessary, to an extent which provides level towing of the trailer by the towing vehicle.

It will be understood that the foregoing sequence of events is reversed when it is desired to park a trailer on the ground support stand and then disconnect the trailer from the towing vehicle. Moreover, it will be apparent that the upper position 55 of the hitch support arm may be sufficiently high to elevate the trailer to the position shown in broken lines at 67, whereat the material contents of the trailer can be dumped from the rear end thereof.

It is thus seen that the embodiment of apparatus shown in FIGS. 5-7 provides a towing vehicle with a hitch that is mounted for a limited extent of movement in a substantially vertical direction, so that a trailer can be towed, elevated sufficiently to allow a ground support stand to be raised or lowered without interference with the ground, and then hitched or unhitched from the towing vehicle.

It will be understood that the foregoing relates only to preferred embodiments of the invention, and that numerous alterations or modifications may be made therein without departing from the spirit and scope of the invention as defined in the following claims.

We claim:

1. Trailer vehicle comprising:
 a body, wheel means at a rearward end of said body for supporting said body on a surface, and hitch means at a forward end of said body for selected interconnection to a towing vehicle;
 parking support means disposed on the underside of said body at a forward location with respect to said wheel means, and in facing relation to the support surface;
 said parking support means including a depending surface support member dimensioned to contact such surface and support said forward end at a predetermined elevation above the surface;
 interconnection means interposed between said trailer underside and said surface support member, said interconnection means being operative when at said predetermined elevation to maintain said surface support member in depending position supporting the forward end of said trailer, and said interconnection means being operative to release said surface support member for movement away from such depending position when raised above said predetermined elevation; and means mounted on the underside of said trailer body and including a lost-motion interconnection with said surface support member operative to move said released surface support member away from said depending position and into position in elevated relation to such surface without preventing said movement of said surface support member away from the depending position, so that the elevated surface support member does not interfere with normal towing of the trailer vehicle.

2. Apparatus as in claim 1, further comprising means selectively operative to retain said surface support member in said elevated position.

3. Trailer vehicle comprising:

a body, wheel means at a rearward end of said body for supporting said body on a surface, and hitch means at a forward end of said body for selective interconnection to a towing vehicle;

parking support means disposed on the underside of said body at a forward location with respect to said wheel means, and in facing relation to the support surface;

said parking support means including a depending surface support member dimensioned to contact such surface and support said forward end at a predetermined elevation above the surface;

interconnection means interposed between said trailer underside and said surface support member, said interconnection means being operative when at said predetermined elevation to maintain said surface support member in depending position supporting the forward end of said trailer, and said interconnection means being operation to release said surface support member for movement away from such depending position when raised above said predetermined elevation; and means mounted on the underside of said trailer body and operatively associated with said surface support member for moving said released surface support member away from said depending position and into position in elevated relation to such surface, so that the elevated surface support member does not interfere with normal towing of the trailer vehicle, said means for moving said surface support member comprising;

a crank supported on said trailer underside for pivotal movement and having a crank arm extending alongside said surface support member;

means operatively interconnecting said crank arm and said surface support member to permit said downwardly depending support member to undergo a limited extent of movement relative to said crank arm; and operating means associated with said crank to pivot said crank so that said crank arm moves said released support member upwardly to said elevated position.

4. Apparatus as in claim 3, wherein said crank arm and said surface support member are operatively interconnected to undergo a limited extent of sliding movement relative to each other.

5. Apparatus as in claim 3, wherein said crank includes an operating member extending to a location for manipulation by an operator alongside said trailer vehicle.

* * * * *